Nov. 17, 1936.　　　V. C. ARMSTRONG　　　2,060,782
METHOD OF FABRICATING SPLICE BARS
Filed March 14, 1935　　　2 Sheets-Sheet 1
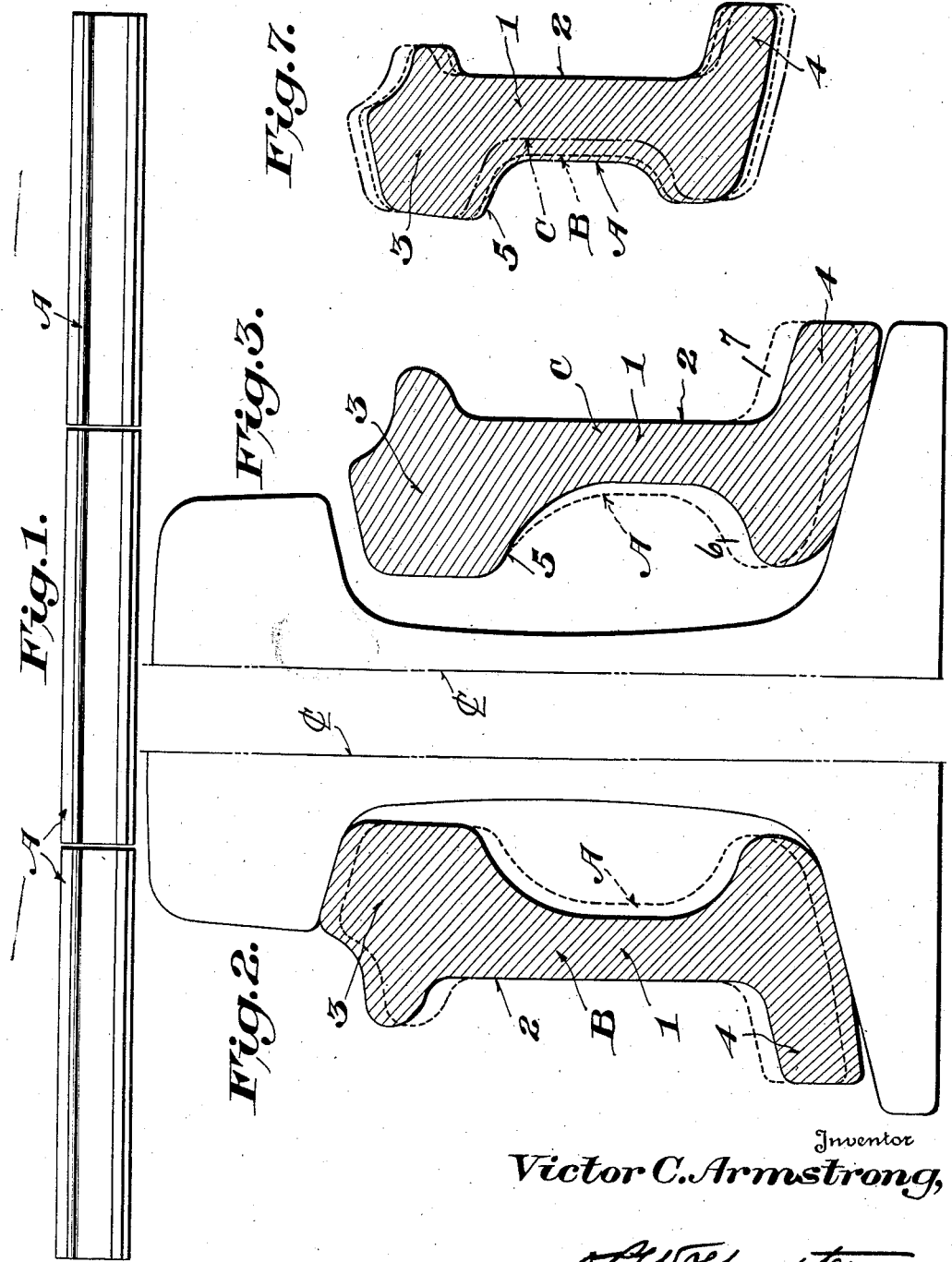
Inventor
Victor C. Armstrong,
By
Attorney Nov. 17, 1936. V. C. ARMSTRONG 2,060,782
METHOD OF FABRICATING SPLICE BARS
Filed March 14, 1935 2 Sheets-Sheet 2
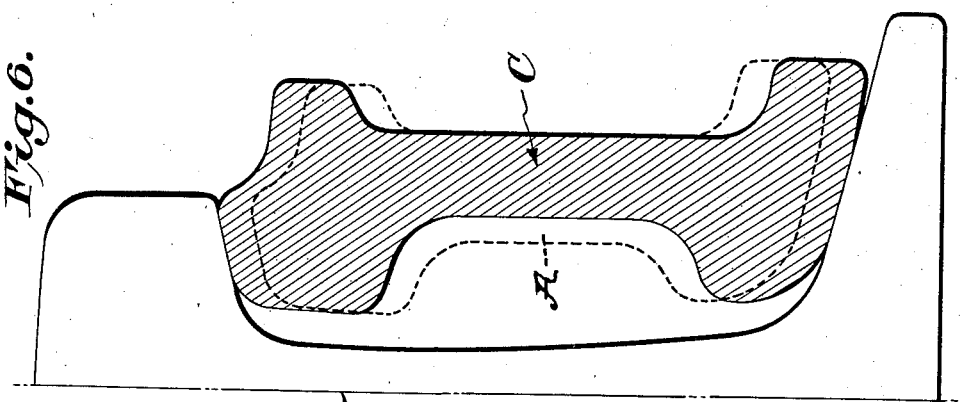
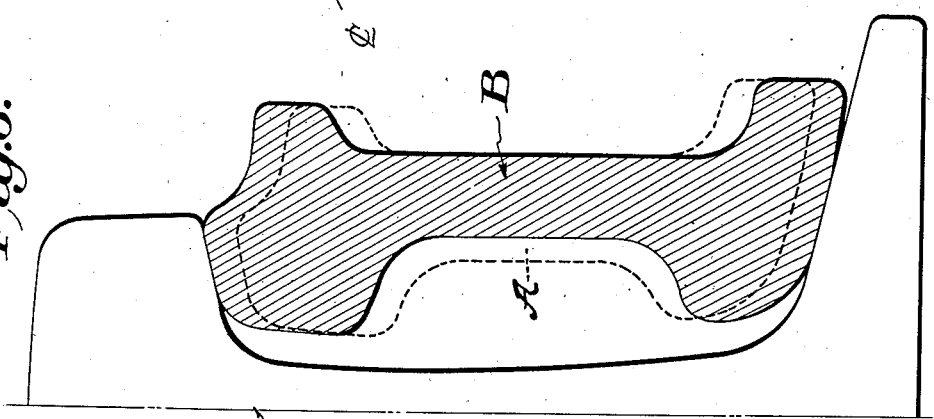
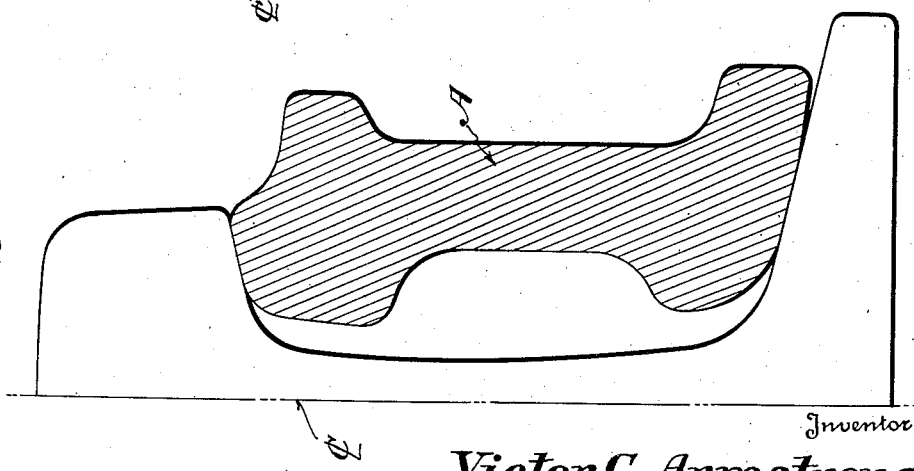
Inventor
Victor C. Armstrong, Patented Nov. 17, 1936

2,060,782

UNITED STATES PATENT OFFICE 2,060,782

METHOD OF FABRICATING SPLICE BARS

Victor C. Armstrong, Short Hills, N. J., assignor to The Rail Joint Company, New York, N. Y., a corporation of New York Application March 14, 1935, Serial No. 11,112

3 Claims. (Cl. 29—169)

This invention relates to the manufacture or fabrication of rail joint splice bars, and more particularly to a novel method of producing new splice bar adaptable for rails of various fishing heights and to that end is a continuation in part of my pending application, Serial No. 488,977, filed October 15, 1930.

The usual practice in the manufacture of new splice bars is to pass the billet or blank of metal between pairs or sets of forming rolls having passes progressively approaching the desired final cross-sectional shape of the bar to be produced, and including a final pass which determines the finished shape and fishing fit for the bar. Necessarily, as commonly practiced a new and separate set of rolls must be made for new splice bars fitting the different rails having fishing spaces of different heights thereby involving the considerable cost of new rolls for new splice bars of different fishing heights. Therefore, an important object contemplated by the present invention is to materially reduce the cost of manufacture of new splice bars, and at the same time provide a method which facilitates, within a safe range, the manufacture of a new splice bar, from one set of rolls, which is adaptable for different rails of different fishing heights.

Accordingly, the present inventive concept in its broader aspect, resides in the fabrication of new splice bars by a new method which involves the use of a single set of rolls for shaping the basic bar and the subsequent use of properly designed forging dies for proportionally redistributing the metal of the basic bar into other bars for rails of higher fishing. That is accomplished, in a predetermined manner, without material disturbance of the relation between the modulus values above and below the neutral axis in the higher bars, while at the same time as the bars are formed to fit the rails of higher fishings, both the inertia and moduli values of the bars as a whole will increase proportionally.

That is to say, a single set of rolls is employed initially to economically reduce a billet or bar blank to a basic splice bar sectional shape having a fishing fit for a given low-fishing rail; and by the use of forging dies and a forging operation this basic bar may be forged into bars having higher fishing. Thus, the considerable expense of numerous sets of rolls of the prior all-rolling method, and the most expensive forging steps of prior all-forging methods which develop a bar from the blank, are eliminated, with the result that new splice bars produced in accordance with the present method cost considerably less than either all-rolled or all-forged bars produced in accordance with the prior methods, and are at least as strong as bars produced by either prior method. Further, because of both rolling and forging the bars, in the manner contemplated by the present invention, the texture of the metal is not in any way injured or ruptured but in fact by reason of the proportional redistribution of the metal, as the method proceeds, the relationship between modulus values above and below the neutral axis is not materially disturbed, while there is produced for each higher section of bar one of substantially improved or increased inertia or stiffness value with also a proportional increase in the modulus values thereof.

While it has been proposed heretofore to reform old or used splice bars by subjecting them to pressure between dies to squeeze the metal into a shape adapted to fit worn depressions in the heads and bases of the rail and thereby adapt the bar from renewed service, the present invention distinguishes from that practice in two important particulars, one of which is that the basic bar of the present invention must be accurately designed and shaped and scientifically computed to embody a proportional relation of metal so as to have predetermined physical properties and a predetermined area which will permit this basic bar to have its metal proportionately redistributed to provide other bars of greater fishing height. The other distinguishing feature of the present invention is that the forging or die pressing operation to increase the fishing height of the basic bar is performed while the bar is unfinished as to its bolt holes, which because of distortion in the expanding operation would seriously interfere with the proper redistribution of metal contemplated by the present invention.

The method of the present invention may be illustrated in the accompanying drawings, in which:—

Figure 1 is an elevational view of a rolled splice bar strip cut into rail joint lengths, being the first step of the method.

Figure 2 is an outline or end elevation of a rail joint splice bar fabricated in accordance with the present invention illustrating a redistribution of metal in various parts of the bar to accomplish the expansion of the same from a basic form of relatively low-fishing height to a bar of greater fishing height.

Figure 3 is a similar view illustrating the redistribution of metal in the basic bar somewhat different from the redistribution of metal shown in Fig. 1.

Figures 4, 5 and 6 are illustrative views demonstrating the method of preforming a given basic splice bar with predetermined properties and area and developing from that bar, by a forging or pressing operation, either of two bars of greater fishing height.

Figure 7 is a composite view of superimposed splice bar outlines further illustrative of the changes in metal distribution involved in developing a given basic bar section into bar sections of higher fishing.

Like reference numerals designate similar parts in the different figures of the drawings.

As indicated supra the present invention continues through this application that part of my pending application, Serial No. 488,977, wherein a new splice bar fabrication, without bolt holes, is shown as distinguished from worn joint bars, and involving as pointed out in said specification, the making of joint bars of relatively low fishing heights to fit rails of greater fishing height by displacing both the head and the base of the bar upwardly and downwardly, respectively, or by displacing either the head or base of the bar, upwardly or downwardly, as the case may be, throughout the entire length of the bar. That is to say, the distribution of metal in forging or pressing the basic bar shape without bolt holes may involve only the metal of the head or base of the bar or of both, or by displacing metal from the web of the bar into the head of the base or into both the head or base thereof to increase the height of the bar. This is all well illustrated by the drawings to which particular reference will now be made.

The splice bar to be fabricated involves the usual web 1 with the outer flat bolting face 2, the head portion 3 which has head fishing contact with the rail and the foot portion 4 which has fishing contact with the rail flange. These are the usual elements or principal parts of a rail joint splice bar and taking Fig. 2 of the drawings as the first example of the present invention the dotted outline A in said figure of the drawings represents the basic bar section developed in the passes of a rolling mill and the full line outline B designates the bar which is fabricated from the basic bar A. This fabrication is accomplished by forging dies which are so designed as to redistribute the metal of the web and head and foot of the basic bar to provide the bar B of a greater fishing height than the bar A and therefore adapted to fit a higher fishing space of a different rail from a rail having a fishing space that the basic bar A would approximately or fully fit initially.

By comparing what is shown in Fig. 2 with the illustration of Fig. 3 it will be observed from the latter figure that the redistribution of metal in the basic bar A of this example occurs from a point 5 adjacent the inner lower corner of the head of the bar throughout the inner side of the web of the bar and over the outer and inner foot portions 6 and 7 respectively of the foot 4 of the bar. The result in this case is that by a forging operation, throughout the portions 5, 1, 6 and 7 of the basic bar a proportional redistribution of metal is effected to produce a bar C of higher fishing section than the basic bar A.

It has been pointed out that a primary consideration in practicing the present invention is that of initially producing by a rolling operation the basic bar A according to definite predetermined shape, physical properties and area. This may be illustrated by Fig. 4 of the drawings as showing a basic bar resulting from the shape imparted thereto by the passes of the rolling mill, and this basic bar is preliminarily designed to have a predetermined cross-sectional area and a certain relation between the modulus values above and below the horizontal neutral axis, which relation of modulus values whether substantially balanced or not is carried into such higher splice bar sections as may be forged from the said basic bar A. In the example shown the basic bar A of Fig. 4 has the following physical properties:—

| | |
|---|---|
| Inertia | 10.04 |
| Top modulus | 4.38 |
| Bottom modulus | 4.37 |
| Area | 5.29 |

According to this basic bar of predetermined shape and physical properties the modulus or strength values above and below the neutral axis are, as shown, substantially balanced, there being only .2% difference between the top and bottom section moduli of said bar. In the rolling of this basic bar A, according to the illustration, it may be rolled to fit the fishing of a 130—R. E. rail which may be regarded as the templet for the basic bar. Also, in this basic bar A of Fig. 4 the web thickness, which takes into consideration subsequent reductions by the forging operation is given as 1⅜″, with a difference of 2″ out to out of the outer bolting face 1 from the center line (c.l.) of the rail, which the basic bar fits initially.

Having obtained the basic bar A of given and predetermined cross-sectional area and physical characteristics by means of the rolling operation with the use of a single set or train of rolls, if it should be desired to utilize that rolling, prior to the punching of the bolt holes, for the fabrication of a splice bar of greater fishing height than the bar A, that may be accomplished, according to the present invention by the employment of forging or pressing dies so cut as to proportionally redistribute the metal of the basic bar A in a manner that will not disturb materially the relationship between the modulus values above and below the neutral axis, and at the same time proportionately increase the inertia and modulus values of the whole bar without injury to the metal fibres. Such a proportional enlargement of the basic bar A is indicated by the enlarged bar B of Figure 5 wherein there is a radical redistribution of metal throughout the whole bar, not only in the web which is reduced to 41/64″ but also in the head and foot portions of the bar. Such a proportionally developed enlarged bar is shown as adapted to have a fishing fit in a rail that is designated as 127—D and the physical properties of such a bar B are as follows:

| | |
|---|---|
| Inertia | 13.39 |
| Top modulus | 5.33 |
| Bottom modulus | 5.23 |
| Area | 5.29 |

From this tabulation of phyical properties it will be observed that the relationship between the top and bottom modulus values of the basic bar are not materially changed, there being only a slight fractional difference of 1.8% between the top and bottom modulus values of the bar B of Fig. 5, while at the same time there is a very considerable increase of approximately 33% in the inertia or stiffness value of said bar over the inertia or stiffness of the bar A of Fig. 4.

As a further example, should it be desired to redistribute the metal in the basic bar A of Fig. 4 to provide a splice bar C fitting the fishing, for instance of 131—R. E. rail (Fig. 6) by a pressing or forging operation, the area and physical properties of the bar A are such as to permit the same to have the metal in its web, head and foot redistributed in such a manner as to very substantially increase the fishing height of the bar so that it may be made to fit the higher rail shown in Fig. 6 and without material disturbance of the relation between the top and bottom modulus values of the bar A. The new bar C developed from the bar A has a web thickness of ⅝", and maintains the same 2" out to out from the c.l. of the rail to the outer bolting face of the bar and the said bar C also has the following physical properties:—

Inertia _____ 13.68
Top modulus_____ 5.39
Bottom modulus_____ 5.32
Area_____ 5.29

From this tabulation it will be seen that the enlarged bar C maintains substantially the same relation between the modulus values above and below the neutral axis as the relation between the modulus values of the bar A, there being only a small percentage difference of 1.3% between the top and bottom modulus values of the bar C. This range of percentage between the top and bottom modulus values of these various bar sections, developed from the basic bar, may be regarded in all practical respects as substantially equivalent according to the tolerances allowed in fabrication and in calculating these properties on an integrator or by hand. And, it will be understood in accordance with the present invention that if the basic bar A involves a substantial or material difference in the relation between the modulus values above and below the horizontal neutral axis of the bar, it is the purpose of the present invention to maintain substantially that relation in all or any of the bars developed out of the basic bar A.

By way of further illustrating the proportional distribution of metal in bars developed from a basic rolled bar there is shown in Fig. 7 of the drawings a composite view illustrating three splice bars superimposed. In this illustration the basic bar adapted to fit an 85—A rail is designated A as before, the bar B for a one stage enlargement is shown adapted to fit the fishing of a 90—A rail, and the bar C for another stage development is shown adapted to fit the fishing of a 100—A rail.

The superposing of these three bars in Fig. 7 shows very clearly how the metal from the rolled basic bar A is redistributed not only from the web, preferably at the inner side thereof, but also from various parts of the head and foot of the bar within the predetermined limits which maintain in a practical manner the proper relationship between the top and bottom modulus values of the basic bar, and at the same time provide for a predetermined increased inertia value for the bar in its ultimate height. A comparison of the physical properties of the bars A, B and C of Fig. 7 will illustrate the point, as well as the metal distribution which is provided for. The said bars A, B and C of Fig. 7 have the following physical properties:—

Bar A

Inertia _____ 3.68
Top modulus_____ 2.08
Bottom modulus_____ 2.15
Area_____ 3.36

Bar B

Inertia _____ 3.93
Top modulus_____ 2.16
Bottom modulus_____ 2.23
Area_____ 3.36

Bar C

Inertia _____ 4.83
Top modulus_____ 2.50
Bottom modulus_____ 2.56
Area_____ 3.36

It will be seen that in this forging development of bars from A to B or from A to C that the inertia values of the successively higher bars increase proportionately as the height increases, while the relation between the top and bottom modulus values is not materially changed. In that connection it is to be noted that the relation of top and bottom modulus values in the bars A and B of Fig. 7 are almost identical in percentage difference, while in bar C of Fig. 7 there is only a very small fractional percentage difference between the top and bottom modulus values of bar A and the said bar C, all of which demonstrates the feature of this invention that the basic bar has definite predetermined physical properties and an area permitting proportional redistribution of the metal into other safe bars of higher fishing without materially disturbing the relative strength values of the metal represented by the section modulus above and below the neutral axis, while at the same time permitting proportional increase in the inertia and modulus values of the bars as a whole.

From the foregoing it is thought that the essential features of the invention will be clearly understood without further description and it will also be understood that changes can be made in the configuration or design of the splice bar and as to the directions in which the metal is shifted from the basic bar and as to the locations of the shifted metal without departing from the spirit or scope of the invention as defined by the appended claims.

I claim:—

1. The herein described method of fabricating new splice bars which consists first in the step of rolling a blank to a basic bar shape of predetermined area and physical properties, and subsequently subjecting the basic bar to a forging operation to displace metal from the web and to redistribute it proportionally in another part or parts of the bar thereby to increase the fishing height of the basic bar but without material disturbance in the relationship between the section modulus respectively above and below the horizontal neutral axis of the bar.

2. The herein described method of fabricating new splice bars which consists first in the step of rolling a blank to a basic bar shape of predetermined area and physical properties, and subsequently subjecting the basic bar to a forging operation to thereby displace metal from the web, head and foot portions of the bar and proportionally redistribute such metal into the head and foot portions of the bar thereby to provide a bar of greater fishing height than the basic bar and of greater moment of inertia but having substantially the same relationship of modulus values above and below the horizontal neutral axis as exists in the basic bar.

3. The herein described method of fabricating new splice bars which consists first in the step of rolling a blank to a basic bar shape of predetermined area and physical properties, and subsequently subjecting the basic bar to a forging operation to thereby displace metal from the web and other parts of the bar and redistribute the same proportionally in the head and foot portions of the bar to produce a bar of greater fishing height than the basic bar while at the same time maintaining the original relationship laterally between the fishing surface and the outer side of the web of the bar and without material change in the relationship between the top and bottom sectional modulus of the basic bar.

VICTOR C. ARMSTRONG.